United States Patent [19]

Griffin et al.

[11] Patent Number: 4,812,149

[45] Date of Patent: Mar. 14, 1989

[54] HOT INERT GAS PURGING FOR FILTER BLOWBACK PROCESS

[75] Inventors: Rodney L. Griffin, Roy, Utah; David F. Ciliberti; Thomas E. Lippert, both of Murrysville Boro, Pa.

[73] Assignee: Westinghouse Electric Corp., Pittsburgh, Pa.

[21] Appl. No.: 128,310

[22] Filed: Dec. 3, 1987

[51] Int. Cl.⁴ ............................................... B01D 39/20
[52] U.S. Cl. ............................................. 55/71; 55/80; 55/82; 55/96; 55/97; 55/302
[58] Field of Search ................. 55/71, 73, 96, 97, 302, 55/523, 80, 82

[56] References Cited

U.S. PATENT DOCUMENTS

| | | |
|---|---|---|
| Re. 24,954 | 3/1961 | Church . |
| 2,721,626 | 10/1955 | Rick ................................. 55/97 X |
| 3,325,979 | 6/1967 | Smith . |
| 4,343,631 | 8/1982 | Ciliberti . |
| 4,735,635 | 4/1988 | Israelson et al. ..................... 55/71 |

FOREIGN PATENT DOCUMENTS 507337  8/1976  U.S.S.R. .

OTHER PUBLICATIONS

Myers, Application Ser. No. 534,193, filed Dec. 19, 1974, laid open to public inspection on Sep. 7, 1976.

Primary Examiner—Charles Hart
Attorney, Agent, or Firm—R. A. Stoltz

[57] ABSTRACT

A filter cleaning process for filters for separating particulates from a hot gas stream using hollow, tubular filter elements. Blowback and hot purge gas systems provide for cleaning of the filter elements and maintenance of the blowback system clear of the solids or condensation products that might form during separation. The process is especially useful in filtering solids from a hot, corrosive gaseous stream, such as a zirconium tetrachloride process gaseous stream, where the gas stream contains gaseous constituents that are subject to condensation directly to a solid during separation of the particulates and prior to discharge from the filtering apparatus.

15 Claims, 4 Drawing Sheets

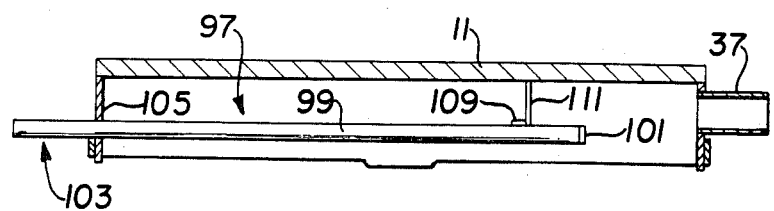
FIG. 9
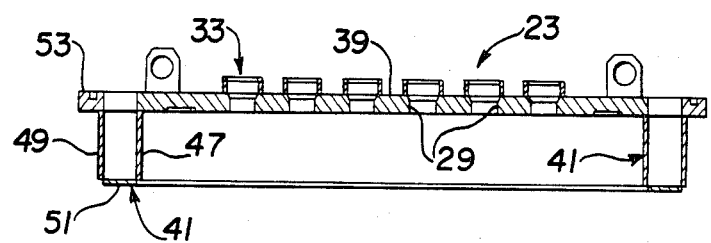
FIG. 4
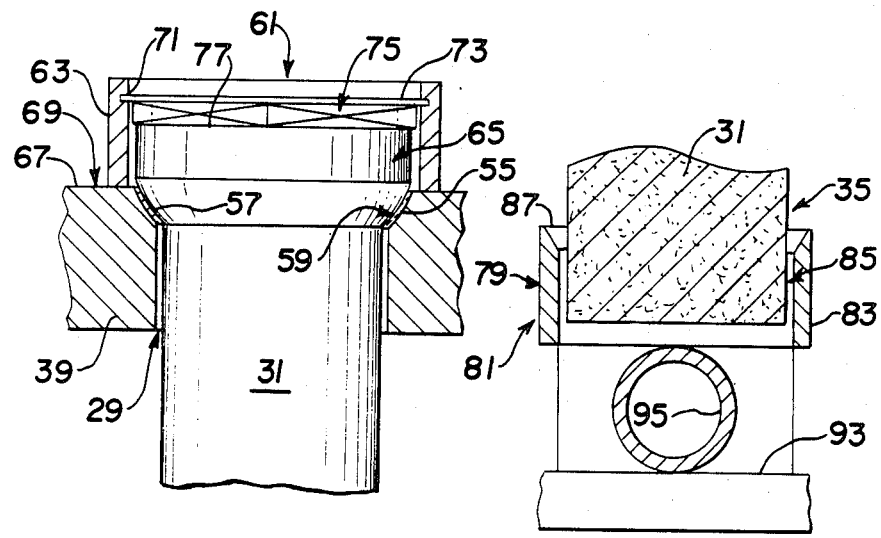
FIG. 5
FIG. 6

HOT INERT GAS PURGING FOR FILTER BLOWBACK PROCESS

FIELD OF THE INVENTION

The present invention relates to a filter cleaning process for the separation of particulate material, and especially for blowback systems to clean filters for the continuous separation of particulates from hot, corrosive gas streams.

BACKGROUND OF THE INVENTION

Many processes exist wherein a hot gaseous medium is produced which contains particulate material that must be separated from the gaseous medium, either to prevent pollution, to remove hazardous material, or to reclaim the particulates for further use. Numerous such processes use fluidized bed reactors which produce a hot, corrosive gaseous mixture from which particulate material must be removed.

In the formation of zirconium tetrachloride from zirconia sand, for example, a fluidized bed can be used to chlorinate zirconia and extract zirconium from zirconia sand. Zirconia sand and coke are fluidized by nitrogen and chlorine gases at low pressure and high temperature producing zirconium tetrachloride as the useful product gas. As with all fluidized bed systems, some reactant is lost as small unreacted solid particulates of sand and coke are carried over by the process gas into downstream equipment. To minimize this reactant loss, the upper section of the reactor is usually enlarged in size to reduce process gas velocity which minimizes the particle size of particulates carried out of the reaction chamber. This enlarged section is called the disengagement section. To further improve operating efficiency, cyclones can be installed in or above the disengagement section. In the last ten years, a considerable amount of development effort has been expended developing an alternative to cyclones for control of particulates in high temperature fluid bed reactor processes.

One type of system for the removal of particulates from a hot gas stream is described in U.S. Pat. No. 4,343,631 to David F. Ciliberti, and is assigned to the assignee of the present invention. In that system, a compact, cross flow filter apparatus is described containing a plurality of relatively small cross flow ceramic filter elements or blocks, and ducts or tubes that are nested in an arrangement to form a high density filter system.

In place of block-like cross flow filter elements, it has been proposed in the prior art to use ceramic candle filter elements in high temperature gas filtration techniques. Such ceramic candles can be formed from silicon carbide or other ceramics which have mineral fiber flakes therein, and are hollow tubuar elements, with the gas passed through the walls of the tubular element, such that particulates collect on the outer walls, and the cleaned gas discharged from the hollow of the tubular member. Pulse, or blowback gas can be supplied from a plenum in a head of a vessel containing the candles to permit cleaning of portions of the candles in the vessel in sequence.

U.S. Pat. No. Re. 24,954 issued Mar. 28, 1961 to Church shows apparatus for filtering solids from gas-solid suspensions and shows a chamber inside top cover 28 which chamber apparently provides some preheating of his blowback pulse. U.S. Pat. No. 3,325,979 issued June 20, 1967 to Smith shows a filter bag system in which, at column 3, lines 37-40, it is noted that "if desired, the source of reverse air may be the discharge of the fan, rather than the atmosphere, to provide warmer gases and prevent sudden chilling of the bags." Russian Patent 507,337 published Aug. 25, 1976, to Kabanov shows a filter system with a pulsed blowback and also with a periodic introduction of warm air to oxidize soot and to carbon monoxide and carbon dioxide to free the deep pores of the filter elements of soot.

It is an object of the present invention to provide a blowback type filter cleaning process for hollow, tubular filter elements for the continuous filtering of solid particulate material from hot gas streams, particularly corrosive gas streams.

It is another object of the present invention to provide a filter cleaning process for use in continuous filtering particulate material from hot gas streams which contain gaseous constituents that are subject to condensation or solids formation during the separation of the particulate material through cooling of the gas stream below a particular temperature value (i.e., at temperatures between 100° C. and the filter operating temperature).

SUMMARY OF THE INVENTION

This process enables the separation of particulate material from hot, gas streams that contain particulates and gaseous constituents that would condense or form solids during the separation unless high temperatures (at least 280° C.) are maintained throughout the system, and is especially useful for separating solids from a zirconium tetrachloride formation process gaseous stream.

This is a process for cleaning of particulate filters for a hot gas stream in a continuous manner. Typically the filters have hollow, tubular elements having an open top, where the product gas stream is passed through the walls of the filter elements and clean gas discharged from the open top, with a blowback gas used to clean the filter elements, has a housing divided into upper and lower sections by a laterally extending divider, such as a support plate for the filter elements. The support plate can be attached to the housing by means of laterally flexible connections. Generally, the hollow, tubular filter elements are supported in orifices in the support plate and the bottom of the filter elements restrained from lateral movement by restraining rings surrounding the bottom, while the filter elements are biased into contact with the support plate by a biasing means such as a pipe surrounding the open end of the filter element and a spring enclosed by the pipe bearing against the top of the hollow, tubular filter element.

The blowback system includes a conduit with a gas port directed towards the open end of the filter element and a hot (at least 280° C.) purge gas is essentially continuously passed through the conduit during normal operation of the filter apparatus to maintain the gas port and conduit clear of condensate of the product gas.

This process for filtering particulate materials from a hot (as used herein, hot means at least 280° C.) gas stream of the type of which contains gaseous constituents that are subject through cooling of the gas stream to condensation or solids formation during the separation of the particulate material. It is utilized with ceramic filters having blowback gas ports which are supplied with gas through blowback conduits and which blowback gas ports are utilized for cleaning the filter. A purge gas flow continually exits through the blowback gas ports, however, the cleaning is provided by blowback gas pulses. The purge gas flow is preheated to above the condensation temperature of the component of the gas stream which is subject to condensation or solids formation, thus condensation in the blowback gas ports and blowback conduit is substantially avoided. Surprisingly, reasonable flow rates of purge gas alone has not kept the conduits and gas ports from plugging during long periods of operation. Apparently, despite the flow, there is some small back diffusion, and a slow buildup of condensate. Materials, such as zirconium tetrachloride, while going directly from the gas to the solid phase are especially troublesome.

This process is especially useful for gas streams containing a gaseous chloride of a group IV-B metal (e.g., zirconium tetrachloride or titanium tetrachloride), or where the gas stream is consequently elemental phosphorus. The gas stream is above 280° C. and the purge gas is heated to above 280° C. (and preferably 331° C., and more preferably, 450° C.). Preferably, an inert gas (especially nitrogen) is utilized as the purge gas.

BRIEF DESCRIPTION OF THE DRAWINGS

FIG. 4 is a vertical cross-sectional view of the support plate and associated laterally flexible means attached thereto;

FIG. 5 is an enlarged view of the section of FIG. 2, enclosed by the circle, identified as V, drawn therein, of a hollow, tubular filter element biasing means connected to the support plate;

FIG. 6 is an enlarged view of the section of FIG. 2, encircled by the circle, identified as VI, drawn at the lower portion of FIG. 2, of the restraining means for the bottom of the hollow, tubular filter element;

FIG. 9 is a view, taken along lines IX—IX of FIG. 8, of a conduit and support therefor for a blowback and purge means of the present apparatus.

DETAILED DESCRIPTION

This invention is an improvement on U.S. Pat. No. 4,735,635, issued to Israelson et al. on Apr. 5, 1988, which patent is hereby incorporated by reference.

The present process is usable in the continuous separation of particulate material from a hot gaseous stream using hollow, tubular filter elements, and is especially adapted for use with gaseous streams which contain gaseous constituents that are subject to condensation or solids formation during the separation, and prior to discharge from a filtering system, which would clog the system.

Figure 1:
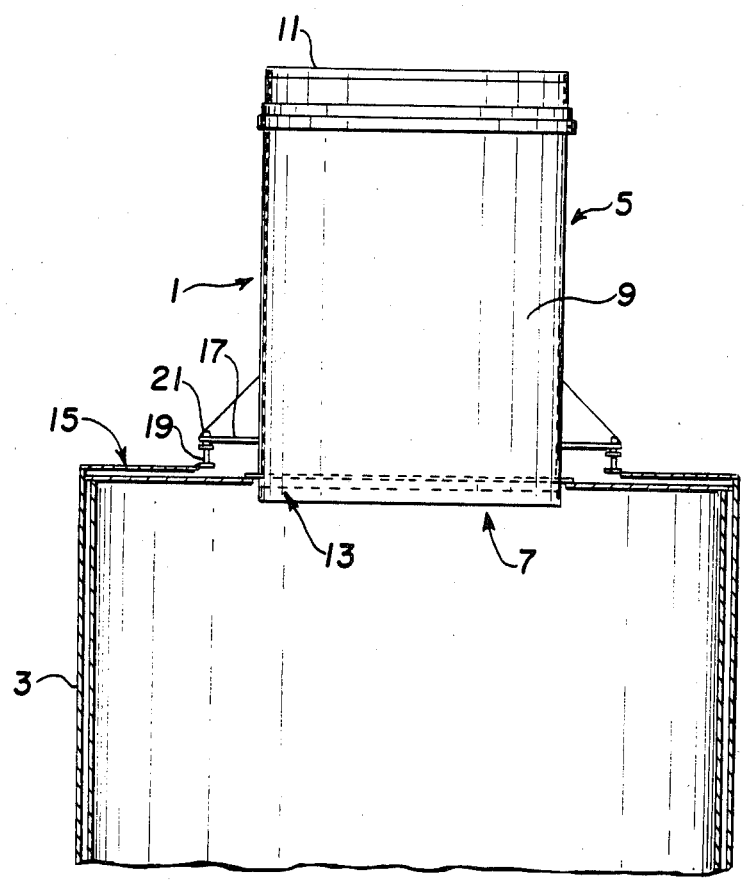
FIG. 1 is a vertical cross-sectional view of a housing of a filtering apparatus mounted atop a reactor, such as a fluidized bed reactor.

Referring now to FIG. 1, filter apparatus 1 is shown mounted on a reactor vessel 3, such as a fluidized bed reactor, the filter apparatus comprising a housing 5 having a bottom open end 7, side walls 9 and a closed top wall 1. The open end 7 of the housing is supported within an aperture 13 in the top wall 15 of the reactor vessel. Mounting of the filter apparatus 1 on the reactor vessel may be achieved by use of flanges 17 extending outwardly from the side wall 9 of the filter apparatus which rest on I-beam supports 19 atop the top wall 15 of the reactor vessel, with jack screws 21 provided for alignment of the filter apparatus relative to the reactor vessel.

Figure 2:
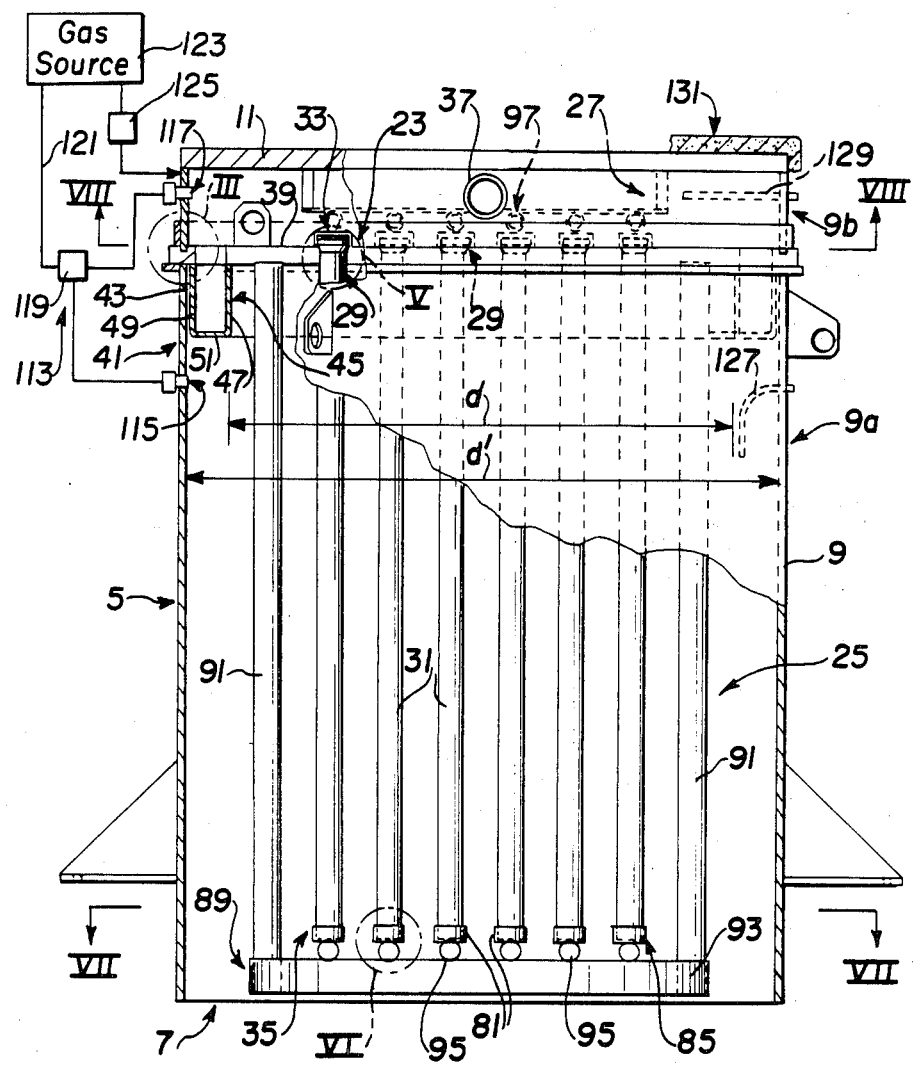
FIG. 2 is a vertical cross-sectional view of filtering apparatus, with a portion of the housing wall intact, and schematically illustrating the purge and blowback gas source and controls.

Extending laterally across the interior space of the housing 5 is a dividing means 23, as illustrated in FIG. 2, which divides the housing into a lower section 25 and an upper section 27, and seals the sections from one another. The divider plate has means thereon, such as spaced orifices 29 for suspending a plurality of hollow, tubular filter elements 31, the hollow, tubular filter elements having an open end 33 and a closed bottom end 35. The hollow, tubular filter elements, and bottom 35 thereof, extend into the lower section 25 of the housing 5, while the open end 33 communicates with the upper section 27 of the housing. The housing 5 may have a cylindrical wall 9 and an array of filter elements 31 are provided in spaced rows, such as thirty-six filter elements in six parallel rows of six filter elements each. A vent 37 for discharge of gas from the top of the housing 5 may be provided, which communicates with the upper section 27 of the housing.

The divider means 23 may be preferably in the form of a support plate 39 having apertures 29 therein, the support plate 39 having a diameter d less than the interior diameter d' of the housing 5, with a laterally flexible means 41 connecting the support plate 39 to the inner surface 43 of the wall 9 of housing 5.

Figure 3:
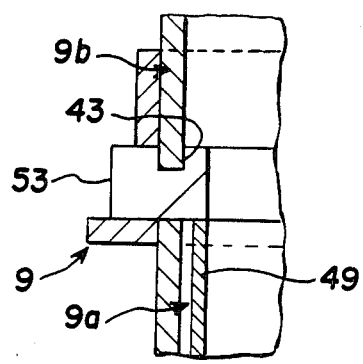
FIG. 3 is an enlarged view of the section of FIG. 2 encircled by the circle, identified as III, drawn at the upper left-hand corner of FIG. 2.

As illustrated, the laterally flexible means 41 may be a U-shaped ring member 45 having a pair of downwardly depending skirts 47 and 49 that are connected together by a closure plate 51 at the bottom of the pair of skirts. One of the pair of skirts, skirt 47 is attached to the perimeter of the support plate 39, and the other skirt 49 is attached to the inner surface 43 of the wall 9 of the filter housing. As illustrated (FIG. 3), the skirt 49 may be attached to a support block ring 53 which is inserted into the wall 9 and separates the wall into lower and upper sections 9a and 9b. The housing 5 and support block ring 53 are designed to be a seal welded together, and not in the nature of a gasketed, bolted closure. This design solves difficulties where corrosive gases, such as chlorine, are present in the housing, which are difficult to contain.

The support plate 39 and attached support block ring are best illustrated in FIG. 4, which shows the interconnecting laterally flexible means 41. Also, as illustrated therein, and in FIG. 5, the support plate 39 has, about the top edge of each of the orifices 29, for support of the hollow, tubular filter elements 31, as bevelled portion 55. The hollow, tubular filter elements have a complementary bevelled shoulder 57 at the outer surface of the upper end thereof, which seats in the bevelled portion 55, and a gasket 59 may be disposed therebetween. The hollow tubular filter elements 31 are biased into contact with the support plate 39 by biasing means 61, which comprises a pipe 63, attached to support plate 39, having an interior diameter larger than the exterior diameter of the top head portion 65 of the hollow, tubular filter element 31, the pipe 63 attached to the upper surface 67 of the support plate, as indicated at 69, and surrounding the orifice 29. Pipe 63 has on its inner surface, a groove 71, into which a snap ring 73, open through its center, is engageable, with the snap ring retaining a biasing means such as a wave spring 75 between the snap ring 73 and top surface 77 of the hollow, tubular filter element 31. In this manner, the head portion 65 of the hollow, tubular filter element 31 is biased towards the gasket 59 on the bevelled portion 55 about orifice 29 in the support plate 39. The wave spring 75, held in place by snap ring 73, maintains a load on the hollow, tubular filter element 31 when the assembly is at a high temperature and the differential thermal growth between the hollow, tubular filter element 31 and the support plate 39 is greatest. This wave spring 75 also allows maintenance of proper seating of the shoulder 57 of the hollow, tubular filter element 31 against bevelled portion 55 when angular rotation of the upper head portion 65 in the orifice 29 occurs. In a sense, a ball-in-socket type of securement of the filter element 31 in the support plate is achieved.

Figure 7:
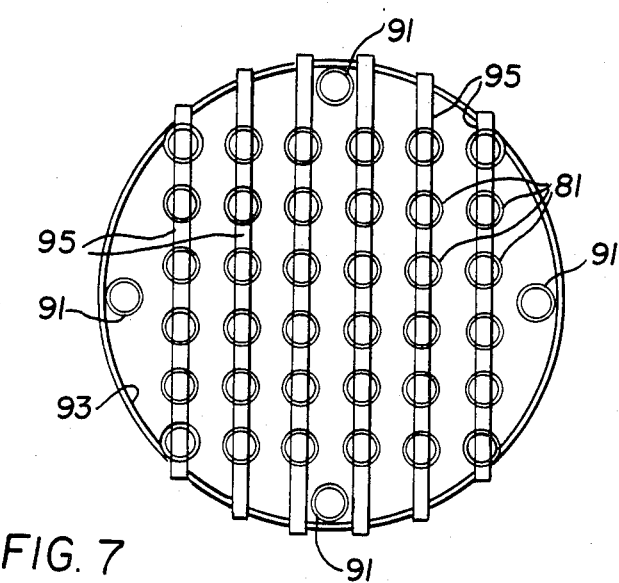
FIG. 7 is a plan view of the restraining means including the restraining rings and support columns and tubular members, for restraining the bottoms of the hollow, tubular filter elements taken along line VII—VII of FIG. 2.

In addition to biasing the open top end 33 of the hollow, tubular filter element 31 into contact with the support plate 39, the closed bottom end 35 thereof is provided with restraining means 79 to prevent lateral movement of the bottom of the filter tube. The restraining means 79 (FIGS. 6 and 7) in the form of restraining rings 81 which surround the bottom end 35 of the hollow, tubular filter element 31, the wall 83 of the ring being spaced from the outer wall 85 of the hollow, tubular filter element 31. Preferably, the wall 83 of the restraining ring has an inwardly directed flange 87 which extends towards the surface 85 of the hollow, tubular filter element. The restraining rings 81 are supported in a capturing position relative to the bottom end 35 of the hollow, tubular filter element 31 by a brace 89 (FIG. 2) which comprises a plurality of columns 91 depending from the support plate 39 to below the bottom ends 35 of the hollow, tubular filter elements 31, which columns 91 have a bracing ring 93 attached adjacent the bottom thereof, with a plurality of trbular members 95 extending across the bracing ring 93 below the hollow, tubular filter elements 31. The restraining rings 81 are attached to, and spaced along the tubular members 95.

Figure 8:
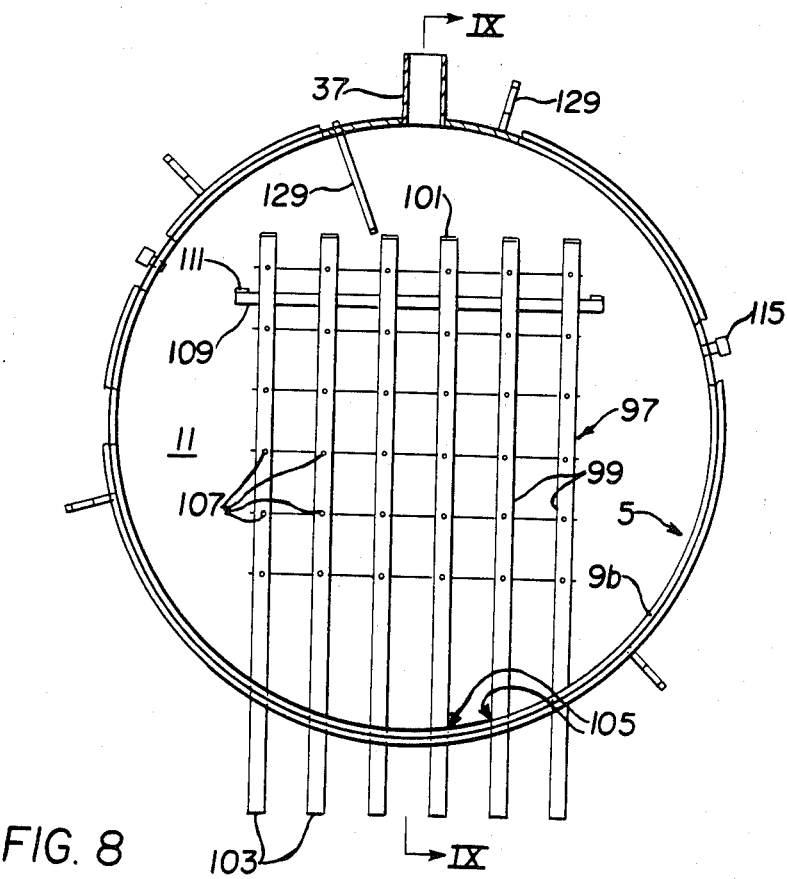
FIG. 8 is an underside view of the blowback and purge gas means connected to the upper section of the housing of the filtering apparatus of the present invention taken along line VIII—VIII of FIG. 2.

A blowback means 97 for passing a blowback gas into the open ends 33 of the hollow, tubular filter elements 31 so as to dislodge solids collected on the outer surface of those elements as illustrated in FIGS. 8 and 9, is provided in the upper section 27 of the housing 5. The blowback means 97 is illustrated as a plurality of tubular members or conduits 99 closed at one end 101 and open at the other end 103, which open end is connected to a source of pressurized gas. The conduits pass through apertures 105 in the wall 9b and extend across the open tops 33 of the hollow, tubular filter elements 31, with gas ports 107 provided, spaced along conduits 99 and directed towards said open tops 33. The conduits may be secured in position by connecting means such as a cross bar 109 extending across and attached to the conduits 99, which cross bar is secured to the top wall 11 of the housing by arms 111.

Pressure sensing means 113, such as pressure tap 115 in the lower section 25 of the housing 5 and pressure tap 117 in the upper section 27 of the housing 5 are provided through the wall portions 9a and 9b, which pressure taps are connected to pressure sensing control 119, the pressure sensing control 119 operatively associated through a lead 121 to a source of blowback gas 123. When the pressure sensing means 113 detects a predetermined pressure drop between the confines of lower section 25 relative to the confines of the upper section 27 of the housing 5, blowback gas (preferably not preheated, as preheating the blowback gas has been found to be unnecessary and complicated and preheating tends to lessen the shock and thus decrease the effectiveness of the blowback) is discharged through valve means (not shown), to conduits 99 and through ports 107 into the open tops 33 of hollow, tubular filter elements 31 to dislodge solids from the outer surface of the hollow, tubular filter elements 31 within lower sections 25 of the housing 5. The hollow, tubular filter elements can be subjected to a pulse of blowback gas in series, such that rows of hollow, tubular filter elements will be cleaned in succession, with the remaining rows continuing to act as a filter medium to provide for continuous operation of the filter apparatus.

Purge means 125 is also provided, in association with the source of blowback gas 123, to provide for a low release of hot (at least 280° C. and at least the condensation temperature of any component of the product gas which would condense between 100° C. and the operating temperature of the filter) purge gas from the source of blowback gas 123 to maintain the conduits 99 and gas ports 107 free from contamination or plugging by solids. Thermocouple wells 127 and 129 are also provided through the wall sections 9a and 9b to sense the temperature within lower section 25 and upper section 27 of the housing 5. Heat control means such as electric heaters or insulation means 131 may also be provided about the housing 5.

The present invention is especially useful in filtering of hot, corrosive gases from processes wherein the gases carry particulates in a process gas stream. Continuous filtering of hot (280° C. or higher and preferably 350° C. or higher), corrosive, and temperature sensitive gases can be ensured. The blowback and purge gases are those which would not detrimentally effect the constituents of the gaseous stream being filtered and are preferably an inert gas such as nitrogen, or the like.

In a fluidized bed process wherein zirconia sand is chlorinated to extract zirconia therefrom, sand and coke are fluidized by nitrogen and chlorine gases at low pressure and high temperature producing zirconium tetrachloride as the useful product or process gas. Zirconium tetrachloride ($ZrCl_4$) has physical properties which require special temperature controls in a filtration unit for use with such a gas. $ZrCl_4$ sublimes from solid at 331° C. Consequently, in order to maintain $ZrCl_4$ gas in the gaseous state, any filtration unit used to filter such a gas stream must be capable of operating at about 331° C. or higher. At lower temperatures, the solid formation would plug the filtering media.

Such a zirconium tetrachloride process gas stream of chlorination of the ore would generally have a gas composition by volume of $ZrCl_4$—19%; $SiCl_4$—19%; CO—24%; $CO_2$—27%; $N_2$—10% and about 1% $Cl_2$. The product gas of the chlorination which occurs during subsequent processing (the so-called "pure chlorination") is substantially $ZrCl_4$. In apparatus for filtering particulates from such a gas stream, the housing 5 can be supported on the disengagement section of a crude chlorinator reactor. An array of hollow, tubular filter elements, such as 6 rows of 6 each, or a total of 36 elements can be disposed in the support plate, with tubular filter elements of about 5.7 centimeters in diameter by about 1.5 meters in length used.

In order to enable filtering of a corrosive, high temperature and temperature dependent gas, such as a $ZrCl_4$ product gas, the filter housing, dividing means, blowback conduits, and the like can be formed from nickel or a high nickel-content alloy, and the hollow, tubular filter elements are comprised of a porous ceramic material such as sintered silicon carbide, while nitrogen or other inert gas, that would prevent solids formation in the system, is used as the preheated purge gas and the preferably not preheated blowback gas. The hot, corrosive gas stream, at about 480° C., containing particulates enters the open end 7 of the filter housing 5, and surrounds and penetrates the hollow, tubular filter elements 31 leaving the particulate solids on the outside surface thereof. The filtered gas flows axially up the center of the hollow, tubular filter elements 31 into the upper section 27 of the filter housing 5. The filtered gas then flows out of nozzle or vent 37 for collection or use. After sufficient particulate buildup on the outer surfaces of the hollow, tubular filter elements 31, such that a predetermined pressure differential, such as a pressure differential of about 0.35 to 1.1 pounds per square inch, is effected between lower section 25 and upper section 27 of the filter housing 5, the blowback gas is passed through conduits 99 and gas ports 107 back throug the hollow, tubular filter elements 31, dislodging the accumulated particulate solids therefrom. Nitrogen would preferably be used as the blowback gas and also as the hot purge gas, which continually exits through gas ports 107, to prevent the introduction of oxygen or water into the filter system. Subsequent formation of zirconium oxide $ZrO_2$ (melting point 2700° C.) and $ZrO_2$ $xH_2O$ (melting point 550° C.) by contact with oxygen or water could cause plugging of the hollow, tubular filter elements. To prevent $ZrCl_4$ solid formation and plugging of the blowback gas ports, the continuous nitrogen purge gas is heated above 331° C. and preferably above 450° C.

This process can also be used on titanium tetrachloride and other gaseous chlorides of group IV-B metals. In the case of titanium tetrachloride, both the gas stream and the purge gas are maintained at a temperature at above 280° C. Similarly, the gas stream can be elemental phosphorus, in which case, both the gas stream and the purge gas are maintained above 280° C. Preferably, both the purge gas and the blowback pulse are an inert gas, and most preferably are nitrogen. The gas stream and the purge gas are both generally at a temperature of above 280° C., preferably the purge gas is above 350° C., and most preferably, above 450° C.

The present process thus enables the continuous separation of particulate material from a hot, corrosive and/or temperature sensitive gas stream using hollow, tubular filter elements. The apparatus is provided with differential pressure activated inert gas blowback flushing of the filter elements and uses a heated inert gas continuous purge of the blowback system.

We claim:

1. In a process for filtering particulate materials from a hot gas stream of the type which contain gaseous constituents that have a condensation temperature and are subject to condensation or solids formation during separation of the particulate material through cooling of the gas stream, and in which ceramic filter and blowback gas ports and blowback conduits are utilized for cleaning said filter, and in which a purge gas flow which continually exits through the blowback gas ports is utilized; the improved method which comprises:
preheating said purge gas flow to above the condensation temperature of said component of the gas stream which component is subject to condensation or solids formation during the separation of the particulate material through cooling of the gas stream, whereby condensation in the blowback gas ports and blowback conduits is substantially avoided.

2. The process of claim 1, wherein said purge gas is above 350° C.

3. The process of claim 1, wherein an inert gas is utilized as said purge gas.

4. The process of claim 1, wherein said gas stream contains a gaseous chloride of a group IV-B metal.

5. The process of claim 4, wherein said gas stream is principally zirconium tetrachloride.

6. The process of claim 3, wherein the ceramic in said ceramic filter is principally silicon carbide.

7. The process of claim 2, wherein said gas stream is principally titanium tetrachloride.

8. The process of claim 2, wherein said gas stream is principally elemental phosphorus.

9. The process of claim 5, wherein said purge gas is nitrogen which is heated above 450° C.

10. In a process for filtering particulate materials from a gas stream having a temperature of at least 450° C. said gas stream being of the type which contain at least one gaseous constituent that is subject to condensation or solids formation during separation of the particulate material through cooling of the gas stream and in which a ceramic filter and blowback gas ports are utilized, and utilizing a pulse of blowback gas for cleaning said filter and a purge gas flow which continually exits through the blowback gas ports; the improved method which comprises:
preheating said purge gas to above 450° C.

11. The process of claim 10, wherein said gas stream constituent that is subject to condensation or solids formation is zirconium tetrachloride.

12. The process of claim 11, wherein said purge gas is nitrogen.

13. The process of claim 10, wherein said gas stream constituent which is subject to condensation or solids formation is titanium tetrachloride.

14. The process of claim 10, wherein said gas stream constituent which is subject to condensation, or solids formation is elemental phosphorous.

15. The process of claim 10, wherein said blowback gas is not preheated.

* * * * *